United States Patent
Boothroyd

(10) Patent No.: US 7,397,358 B2
(45) Date of Patent: Jul. 8, 2008

(54) METHOD AND SYSTEM FOR LOCATION-CENTRIC INFORMATION RETRIEVAL FROM WIRELESS DEVICES USING RFID CODING

(75) Inventor: Christopher C. Boothroyd, Vancouver (CA)

(73) Assignee: Aftercad Software Inc., Vancouver, British Columbia (CA)

( * ) Notice: Subject to any disclaimer, the term of this patent is extended or adjusted under 35 U.S.C. 154(b) by 0 days.

(21) Appl. No.: 10/900,299

(22) Filed: Jul. 28, 2004

(65) Prior Publication Data

US 2006/0022030 A1    Feb. 2, 2006

(51) Int. Cl.
*G08B 26/00* (2006.01)
(52) U.S. Cl. .............. 340/505; 340/572.1; 340/572.4; 340/539.1; 340/825.49; 340/825.69; 340/10.1; 235/375; 235/487
(58) Field of Classification Search .............. 340/572.1, 340/572.4, 539.1, 539.13, 825.49, 825.69, 340/10.1, 10.3, 10.51, 505; 235/375, 487; 705/1, 10
See application file for complete search history.

(56) References Cited

U.S. PATENT DOCUMENTS

| | | | |
|---|---|---|---|
| 5,559,520 A * | 9/1996 | Barzegar et al. | 342/357.1 |
| 6,331,817 B1 * | 12/2001 | Goldberg | 340/573.1 |
| 6,486,780 B1 | 11/2002 | Garber et al. | |
| 6,563,417 B1 | 5/2003 | Shaw | |
| 6,614,392 B2 | 9/2003 | Howard | |
| 6,621,417 B2 | 9/2003 | Duncan et al. | |
| 6,847,299 B2 * | 1/2005 | Franks | 340/572.1 |
| 2001/0000958 A1 * | 5/2001 | Ulrich et al. | |
| 2002/0078363 A1 | 6/2002 | Hill et al. | |
| 2002/0089434 A1 | 7/2002 | Ghazarian | |
| 2003/0069806 A1 | 4/2003 | Konomi | |
| 2003/0148775 A1 | 8/2003 | Spriestersbach et al. | |
| 2003/0154480 A1 | 8/2003 | Goldthwaite et al. | |
| 2003/0155413 A1 | 8/2003 | Kovesdi et al. | |
| 2003/0222792 A1 | 12/2003 | Berman et al. | |
| 2004/0008114 A1 | 1/2004 | Sawyer | |
| 2004/0024570 A1 | 2/2004 | Muehl et al. | |
| 2004/0110515 A1 | 6/2004 | Blumberg et al. | |
| 2004/0111335 A1 | 6/2004 | Black et al. | |

FOREIGN PATENT DOCUMENTS

| | | |
|---|---|---|
| CA | 2315956 | 2/2001 |
| WO | WO 01/67265 | 9/2001 |
| WO | WO 2004/046999 | 6/2004 |
| WO | WO 2004/047000 | 6/2004 |
| WO | WO 2004/047350 | 6/2004 |
| WO | PCT/CA2005/001189 | 8/2006 |

* cited by examiner

*Primary Examiner*—Hung Nguyen
(74) *Attorney, Agent, or Firm*—Oyen Wiggs Green & Mutala LLP

(57) ABSTRACT

The present invention provides an RFID device and RFID reader to obtain an ID string from the device which is then transmitted over the internet to a remote system that uses the ID string to retrieve information related to that ID string. The remote system prepares a 'menu' of information which may or may not contain complete data entries for each found data item related to the ID String. The menu is transmitted back through the internet to the RFID reading apparatus or any other device and presented to the user. The user can then select a data item from the menu and view its contents.

20 Claims, 2 Drawing Sheets

METHOD AND SYSTEM FOR LOCATION-CENTRIC INFORMATION RETRIEVAL FROM WIRELESS DEVICES USING RFID CODING

TECHNICAL FIELD

The invention relates to methods and systems for storing, managing and accessing information, particularly location-centric information through wireless devices.

BACKGROUND

Radio Frequency Identification RFID tags are in common use for various applications. Such devices emit a radio frequency signal when interrogated by an interrogator which emits a radio frequency excitation signal. The tag or transponder is energized by the interrogator to transmit a signal containing an identification code to the interrogator which includes a receiver for receiving and decoding the signal. The tag or transponder may be passive, without a power source but rather using the power of the interrogation signal, or may include a source of electrical power to increase the power and range of the emitted signal. RFID tags typically emit signals at a standard frequency of 915 MHz. Such tags generally have a storage capacity of about 1024 bits part or all of which is used to store the tag identification code.

Standard uses of RFID tags have been for security, theft prevention, inventory control and the like. Published patent application U.S.2002/0078363 discloses a handheld device which scans a barcode or interrogates an RFID chip on a product, then is connected to a computer or Internet portal to download further information about the product.

U.S. Pat. No. 6,563,417 discloses a system in which information from RFID tags on products moving along a distribution path is uploaded to a database which can then be accessed. Published patent application no. U.S.2003/0148775 discloses a mobile device which receives information from an RFID on a pallet, and then uses a web browser to determine what needs to be done with the pallet.

None of the prior art contemplates using an RFID tag in combination with a wireless device whereby the RFID identifier string identifies a fixed point geographic indicator, rather than a moving object or product, to access centrally stored information about that location over the Internet which is wirelessly made available to the user at the location.

SUMMARY OF INVENTION

The present invention provides an RFID device and RFID reader to obtain an ID string from the device which is then transmitted over the Internet to a remote system that uses the ID string to retrieve information related to that ID string. The remote system prepares a 'menu' of information which may or may not contain complete data entries for each found data item related to the ID String. The menu is transmitted back through the Internet to the RFID reading apparatus or any other device and presented to the user. The user can then select a data item from the menu and view its contents.

BRIEF DESCRIPTION OF DRAWINGS

In drawings which disclose a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
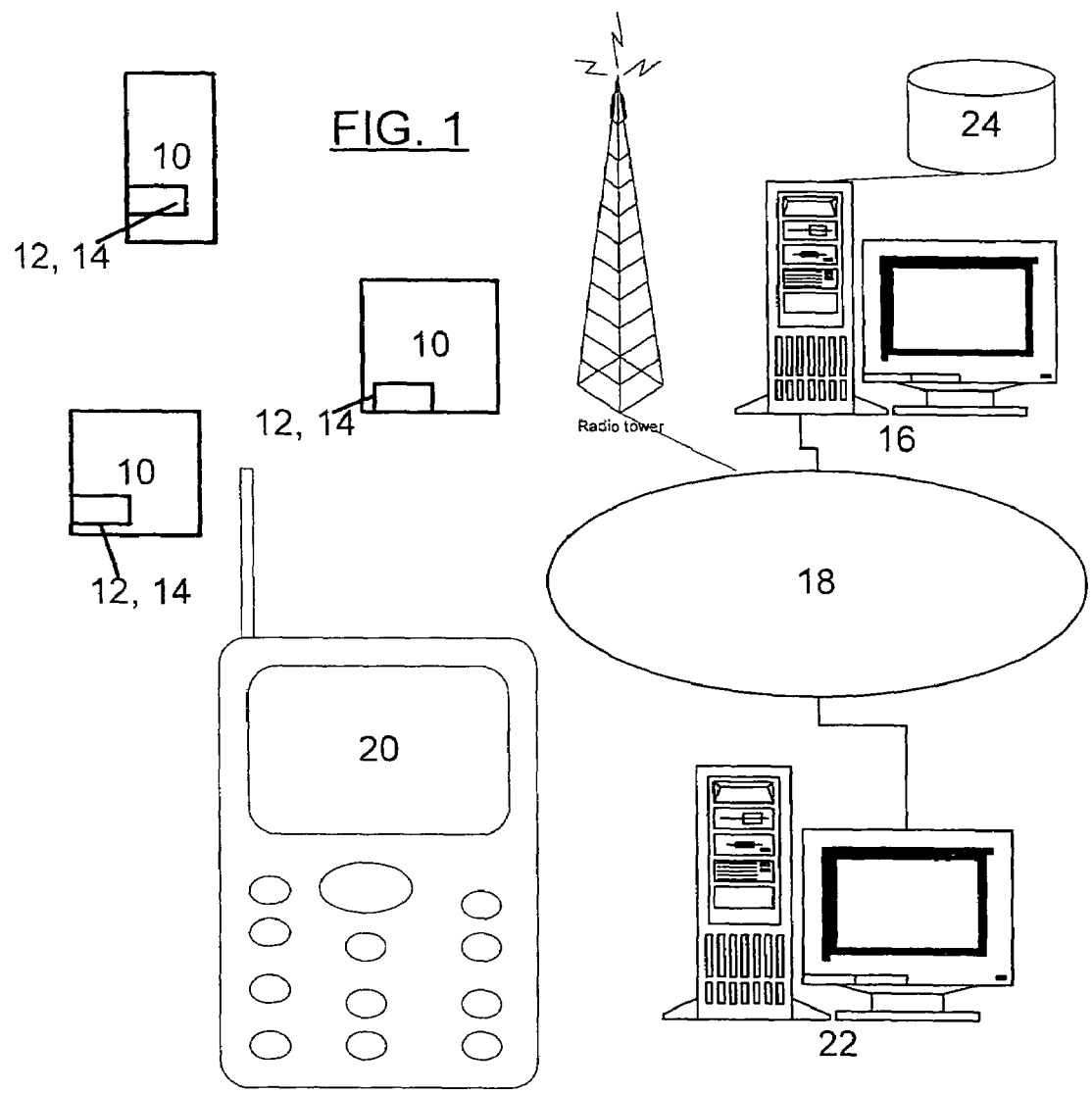
FIG. 1 is a schematic diagram illustrating a computer network for carrying out the invention.
Figure 2:
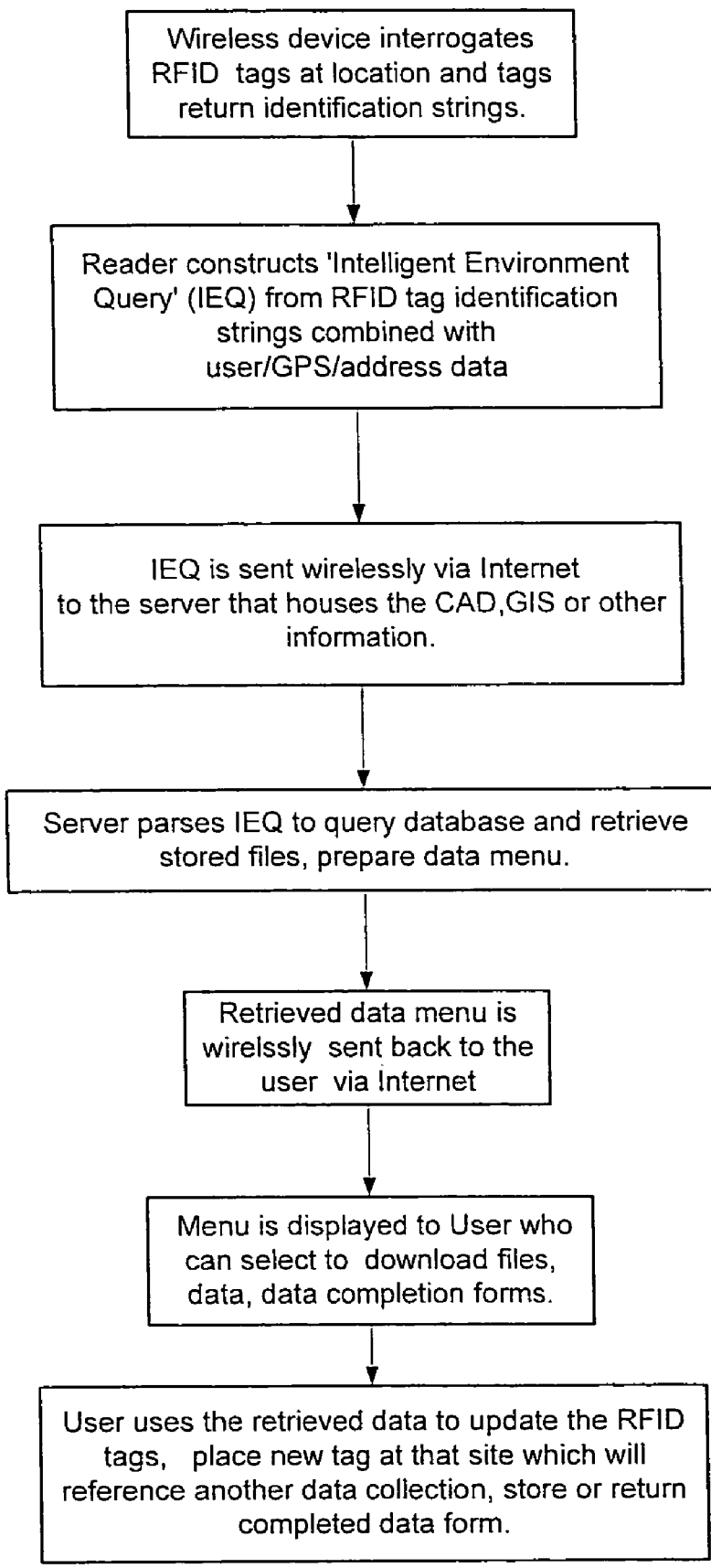
FIG. 2 is a flowchart illustrating the method of the invention.

With reference to FIG. 1, a plurality of fixed objects 10 have affixed thereto or embedded therein passive RFID transponders or tags 12 each storing a unique identifier code or string 14 which is transmitted when interrogated by an RF signal. For example the object may be a maintenance location landmark in a building or an underground utilities passageway. The RFID tag 12 may be read-only or read/write. Suitable RFID tags are sold by Matrics, Inc. Such tags are thin, flexible labels with RFID inlays which can be attached to objects, or the RFID inlay can be encapsulated into a package of rubber, plastic or other material. A read-only tag is preprogrammed with an identification code on manufacture and has a read range of up to 25 feet. A read-write tag has a user programmable memory with up to 120 bit identification code, up to 112 bits for other user data, up to 25 feet read range and up to 10 feet write range.

A central server 16 is accessible via the Internet network 18 via a wireless device 20 using appropriate Internet browser software, or through a standard computer terminal 22. Where the term "wireless device" is used, any wireless telecommunications device such as a cellular telephone, Wireless Application Protocol ("WAP") phones, mobile phone, smart phone, pager, personal digital assistant ("PDA"), wireless laptop or notebook computer and the like are understood. A preferred type of wireless device is a Samsung SPH i700™ handheld wireless device, with a built-in modem which connects over a cellular network to an Internet service provider to provide full TCP/IP access to the Internet.

Server 16 has stored in database 24 specific files 26 associated with each unique identification code 14. Such information will include the geocode for the related object 10, GIS information, information concerning the surroundings of the object, maintenance history, possibly blueprints or CAD files relating to the structure surrounding object 12 etc. Such files can be stored in a flat file format or as part of a spatial database.

Wireless device 20 is preferably equipped with an integral RF transceiver 30 such as an SR 100 RF Receiver Module manufactured by Matrics, Inc. It emits an RF signal in the frequency band 902-928 MHz which excites RFID tag 12 to emit an RF signal containing tag 12's identification code. The RFID identification string is typically an 8 byte string. The transceiver 30 may receive identification signals from one or any number of tags 12 within range of its interrogation signal and which generate a signal within range of the transceiver 30. The interrogation signal may also include a security code to ensure that the tags only respond to the secure interrogation code.

Wireless device 20 then constructs a query, (an "Intelligent Environment Query") using the received string or strings. It may include other information in the query such as a GIS or GPS location or other address location or user data. Wireless device 20 then transmits the constructed query via Internet 18 to server 16. The server 16 then parses the query and retrieves the appropriate files from database 24 in connection with the query. Server 16 prepares 'menu' of data which may or may not contain complete data entries for each found data item related to the query. It may also include data entry forms for the user to complete. The menu is transmitted back through the internet to the wireless device 20 and is displayed to the user. The returned menu may be a simple list of files or may be a visually-enhanced graphic representation of the gathered data, such as a CAD or GIS file having icons for menu items which, when clicked upon present the item to the user.

The user can then select a data item from the menu and view its contents. The user can then also use the retrieved data to update the information on the RFID tag 12 or place one or more further tags 12 at the site with updated information.

For example if a cluster of RFID identification strings 14 has been transmitted as part of the query then the server may determine that one or more identifications is missing from the location and alert the user. In the case of maintenance or utility applications the user may have a selection of CAD drawings, GIS files, instruction or technical manuals in the form of .pdf files or word processing files, or other pertinent or relevant files or information, including graphic files, satellite information, text and the like to provide a maintenance history and support for the location. The user may also select to download data collection forms to be completed by the user and which can then be stored in wireless device 20 or sent over the Internet to be updated in database 24.

A particular advantage of the present invention is where precise GPS location of the target object by the user is not possible due to the location of the object, such as within a building or in an underground tunnel or the like. In this case a GPS device could locate the user at the on-site location and then the present method could be used to obtain more precise geo-centric information from the object locations within the building, tunnel etc.

The invention is also useful where the maintenance location is extensive but may move geographically, such as a ship at sea, train, truck or airplane. In that case the transceiver receives multiple RFID identification strings from multiple tags which are used to construct the IEQ query and to query the database, without including the single GPS location of the moving location, but rather using the relationship fixed relative locations of the multiple tags.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of providing information via the Internet, in respect of a target location which is fixed with respect to a larger object, to a user having Internet access, comprising:
   a) providing a plurality of RFID transponders fixed relative to each other and to said target location and each carrying a unique RFID code;
   b) providing a database accessible to said user via the Internet and an Internet accessible server adapted to store data in said database about said target location corresponding to said plurality of unique RFID codes and to interactively communicate information to said user via the Internet;
   c) constructing said database by storing data about said target location in association with said plurality of unique RFID codes and the relationship of said plurality of RFID transponders;
   d) providing said user with an RFID interrogator for interrogating said RFID transponders and receiving said plurality of unique codes;
   e) said user interrogating said RFID transponders and receiving said plurality of unique codes;
   f) said user constructing a query including said plurality of unique codes;
   g) said user communicating said query to said server over the Internet;
   h) said server retrieving data stored in said database in response to said query based on the relationship of said plurality of RFID transponders; and
   i) said server communicating and displaying to said user information relating to said data retrieved based on said query;
   wherein said larger object is not fixed with respect to the Earth, and is selected from the group consisting of ships, trains, trucks and airborne vehicles, and said interrogator receives said plurality of unique codes from said plurality of RFID transponders which are used to construct said query and to query said database, using the fixed relative locations of said plurality of RFID transponders.

2. The method of claim 1 wherein said user accesses said database from a wireless device.

3. The method of claim 2 wherein said communication to said user is by display on said device.

4. The method of claim 2 wherein said wireless device is selected from the group cellular telephone, mobile phone, smart phone, pager, vehicle onboard data terminal and personal digital assistant.

5. The method of claim 1 wherein said user accesses said database from a computer terminal.

6. The method of claim 1 wherein said data includes CAD files.

7. The method of claim 1 wherein said data includes GIS files.

8. The method of claim 1 wherein said data includes a form for completion and storage by the user.

9. The method of claim 1 including the further step of the user communicating updated information to said server for storage in said database.

10. A system for providing information via the Internet, in respect of a target location which is fixed with respect to a larger object, to a user having Internet access, comprising:
   a) a plurality of RFID transponders fixed relative to each other and to said target location and each carrying a unique RFID code;
   b) a server accessible to a user on the Internet and comprising an Internet accessible server adapted to
      i) provide a database accessible to a user on the Internet and store data about said target location corresponding to said plurality of unique RFID codes and to interactively communicate information to said user;
   c) an RFID interrogator for interrogating said plurality of RFID transponders and receiving said plurality of unique codes;
   d) means for constructing a query including said plurality of unique codes and communicating said query to said server over the Internet and interactively displaying to said user information based on the data stored in said database in association with said query based on the relationship of said plurality of RFID transponders;
   wherein said larger object is not fixed with respect to the Earth, and is selected from the group consisting of ships, trains, trucks and airborne vehicles, and said interrogator receives said plurality of unique codes from said plurality of RFID transponders which are used to construct said query and to query said database, using the fixed relative locations of said plurality of RFID transponders.

11. The system of claim 10 wherein said user accesses said database from a wireless device.

12. The system of claim 11 wherein said communication to said user is by display on said device.

13. The system of claim 11 wherein said wireless device is selected from the group cellular telephone, mobile phone, smart phone, pager, vehicle onboard data terminal and personal digital assistant.

14. The system of claim 10 wherein said user accesses said database from a computer terminal.

15. The system of claim 10 wherein said data includes CAD files.

16. The system of claim 10 wherein said data includes GIS files.

17. The system of claim 10 wherein said data includes a form for completion and storage by the user.

18. The system of claim 10 including the further step of the user communicating updated information to said server for storage in said database.

19. A method of providing information via the Internet, in respect of a target location which is fixed with respect to a larger object, to a user having Internet access, comprising:
  a) providing a plurality of RFID transponders fixed relative to each other and to said target location and each carrying a unique RFID code;
  b) providing a database accessible to said user via the Internet and an Internet accessible server adapted to store data in said database about said target location corresponding to said plurality of unique RFID codes and to interactively communicate information to said user via the Internet;
  c) constructing said database by storing data about said target location in association with said plurality of unique RFID codes and the relationship of said plurality of RFID transponders;
  d) providing said user with an RFID interrogator for interrogating said RFID transponders and receiving said plurality of unique codes;
  e) said user interrogating said RFID transponders and receiving said plurality of unique codes;
  f) said user constructing a query including said plurality of unique codes;
  g) said user communicating said query to said server over the Internet;
  h) said server retrieving data stored in said database in response to said query based on the relationship of said plurality of RFID transponders; and
  i) said server communicating and displaying to said user information relating to said data retrieved based on said query;
wherein said target location is within a structure such that precise GPS location by the user of said target location is not possible and said interrogator receives said plurality of unique codes from said plurality of RFID transponders which are used to construct said query and to query said database, using the fixed relative locations of said plurality of RFID transponders.

20. A system for providing information via the Internet, in respect of a target location which is fixed with respect to a larger object to a user having Internet access, comprising
  a) a plurality of RFID transponders fixed relative to each other and to said target location and each carrying a unique RFID code;
  b) a server accessible to a user on the Internet and comprising an Internet accessible server adapted to
    i) provide a database accessible to a user on the Internet and store data about said target location corresponding to said plurality of unique RFID codes and to interactively communicate information to said user;
  c) an RFID interrogator for interrogating said plurality of RFID transponders and receiving said plurality of unique codes;
  d) means for constructing a query including said plurality of unique codes and communicating said query to said server over the Internet and interactively displaying to said user information based on the data stored in said database in association with said query based on the relationship of said plurality of transponders;
wherein said target location is within a structure such that precise GPS location by the user of said target location is not possible and said interrogator receives said plurality of unique codes from said plurality of RFID transponders which are used to construct said query and to query said database, using the fixed relative locations of said plurality of RFID transponders.

* * * * *